United States Patent
Meenenga et al.

(10) Patent No.: US 12,466,918 B2
(45) Date of Patent: Nov. 11, 2025

(54) MIXTURES CONTAINING AN AMINICALLY CROSSLINKABLE RUBBER AND POLYETHYLENEIMINE

(71) Applicant: LANXESS Deutschland GmbH, Cologne (DE)

(72) Inventors: Vincenza Meenenga, Oftersheim (DE); Cristian Oprisoni, Oftersheim (DE)

(73) Assignee: LANXESS Deutschland GmbH, Cologne (DE)

(*) Notice: Subject to any disclaimer, the term of this patent is extended or adjusted under 35 U.S.C. 154(b) by 680 days.

(21) Appl. No.: 17/637,978

(22) PCT Filed: Aug. 24, 2020

(86) PCT No.: PCT/EP2020/073638
§ 371 (c)(1),
(2) Date: Feb. 24, 2022

(87) PCT Pub. No.: WO2021/037801
PCT Pub. Date: Mar. 4, 2021

(65) Prior Publication Data
US 2022/0267524 A1    Aug. 25, 2022

(30) Foreign Application Priority Data

Aug. 30, 2019  (EP) .................... 19194660
Apr. 16, 2020  (EP) .................... 20169886

(51) Int. Cl.
| | | |
|---|---|---|
| C08G 73/02 | (2006.01) | |
| C08K 3/36 | (2006.01) | |
| C08K 5/17 | (2006.01) | |
| C08K 5/31 | (2006.01) | |
| C08K 9/04 | (2006.01) | |
| C08K 9/08 | (2006.01) | |
| C08L 23/0869 | (2025.01) | |
| C08L 33/08 | (2006.01) | |

(52) U.S. Cl.
CPC ........... C08G 73/0206 (2013.01); C08K 3/36 (2013.01); C08K 5/17 (2013.01); C08K 5/31 (2013.01); C08K 9/04 (2013.01); C08K 9/08 (2013.01); C08L 23/0869 (2013.01); C08L 33/08 (2013.01); C08L 2201/08 (2013.01)

(58) Field of Classification Search
CPC .... C08G 73/0206; C08K 3/36; C08K 5/0025; C08K 5/17; C08K 9/04; C08L 13/00; C08L 19/006; C08L 21/00; C08L 33/02; C08L 33/08; C08L 33/10
See application file for complete search history.

(56) References Cited

U.S. PATENT DOCUMENTS

| | | | |
|---|---|---|---|
| 3,867,326 A | 2/1975 | Rivin et al. | |
| 3,994,742 A | 11/1976 | Russell et al. | |
| 10,336,918 B2 | 7/2019 | Sakamoto et al. | |
| 2005/0113527 A1* | 5/2005 | Perrella ................ | C08L 9/04 |
| | | | 525/310 |
| 2007/0105971 A1* | 5/2007 | Schaller ................ | C08J 3/28 |
| | | | 427/430.1 |
| 2011/0183875 A1 | 7/2011 | Soddemann et al. | |
| 2017/0267841 A1* | 9/2017 | Feldhues ............... | C08K 3/06 |
| 2022/0267524 A1 | 8/2022 | Meenenga et al. | |

FOREIGN PATENT DOCUMENTS

| | | |
|---|---|---|
| CN | 108047595 A | 5/2018 |
| CN | 110057022 A | 8/2019 |
| CN | 110204709 A | 9/2019 |
| CN | 110204759 A | 9/2019 |
| EP | 2033989 A1 | 3/2009 |
| JP | 50003800 B4 | 2/1975 |
| JP | 3146302 A2 | 6/1991 |
| JP | 2007269855 A2 | 10/2007 |
| JP | 2010180293 A2 | 8/2010 |
| JP | 2015013973 A2 | 1/2015 |

OTHER PUBLICATIONS

Machine translation of CN108047595, obtained from the European Patent Office on Mar. 15, 2023.
European Search Report from corresponding European Application No. 19194660, dated Feb. 20, 2020, two pages.
European Search Report from corresponding European Application No. 20169886, dated Jul. 30, 2020, two pages.

* cited by examiner

*Primary Examiner* — Ana L. Woodward
(74) *Attorney, Agent, or Firm* — Nicanor A. Kohncke; Christopher L. McDavid; Ewa M. Wozniak

(57) ABSTRACT

The invention relates to mixtures containing at least one aminically crosslinkable rubber and a cross-linking system, which consists of at least one crosslinker and optionally at least one vulcanization accelerator, the at least one crosslinker containing polyethylene imine. The invention further relates to the production and to the use of said mixtures; and to the vulcanized products that can be obtained from the mixture, in particular in the form of rubber articles, in particular seals, hoses, membranes and o-rings.

17 Claims, No Drawings

MIXTURES CONTAINING AN AMINICALLY CROSSLINKABLE RUBBER AND POLYETHYLENEIMINE

The invention relates to mixtures comprising at least one aminically crosslinkable rubber and a crosslinking system consisting of at least one crosslinker and optionally at least one vulcanization accelerator, wherein the at least one crosslinker comprises polyethyleneimine, to the production and use thereof and to the vulcanizates obtainable from the mixture, in particular in the form of rubber articles, in particular seals, hoses, membranes and O-rings.

There is a great demand for particularly resistant materials in the fields of automobiles and industrial applications on account of the growing fields of application. Rubbers such as for example polyacrylate (ACM) and ethylene acrylate (AEM) rubbers are important classes of polymers which feature high heat resistance and chemicals resistance.

The crosslinking of these rubbers is typically effected using a crosslinking system comprising a crosslinker and a vulcanization accelerator. Crosslinkers employed are often diamines, for example hexamethylenediamine (HMD), also in its reaction-retarding form as blocked diamine carbamate (HMDC) from which the diamine is formed only by the effect of temperature, and vulcanization accelerators employed are often amidines. The obtainable vulcanizates have a good compression set but the scorch time is short and the vulcanization properties are poor.

The best-known vulcanization accelerators in crosslinking systems of rubbers such as for example ACM and AEM rubbers include the guanidine-containing vulcanization accelerators. These are slow-acting accelerators that can be used to adapt the incipient (scorch) and/or complete vulcanization time.

The guanidine-containing vulcanization accelerators, in particular diphenylguanidine (DPG), diorthotolylguanidine (DOTG) and 1-(ortho-tolyl)biguanide, not only allow adjustment of the vulcanization behavior but simultaneously also improve various important material properties of the rubber mixture, in particular the Mooney viscosity and the material properties of the vulcanizate obtained therefrom, for example tensile strength, compression set and tensile stress values at different elongations.

It is known to those skilled in the art that guanidine-containing vulcanization accelerators liberate volatile organic amine compounds under vulcanization conditions. For example the vulcanization accelerator most widely used in practice, DPG, eliminates aniline in the vulcanization. The also often employed DOTG eliminates o-toluidine during the vulcanization which is carcinogenic in animal tests and in humans. It is moreover concentrated in the products and in air. It is thus only a matter of time until DOTG is prohibited in industry, in particular the automotive industry.

Compounds proposed as alternatives for these accelerators also include tertiary amines such as for example 1,8-diazabicyclo-5,4-undec-7-ene (DBU), though this does not represent a like for like alternative since it results in poorer elastic properties of the uncrosslinked and crosslinked elastomers. Properties that suffer are in particular the degree of crosslinking and tensile strength.

With the aim of avoiding emissions of these organic amines there is a need for novel crosslinking systems for rubbers such as for example ACM and AEM rubbers.

WO2016030469A1 discloses substantially DPG-free rubber mixtures comprising polyethyleneimine. The crosslinking system disclosed here comprises sulfur as the crosslinker and is used for crosslinking a completely different rubber class, namely the nonpolar rubbers such as natural rubber (NR) or the nonpolar synthetic rubbers such as polybutadiene (BR) and styrene/butadiene copolymers (SBR) which are readily crosslinkable with sulfur or else with peroxides on account of their double bonds. By contrast, rubbers such as for example ACM and AEM are generally subjected to diaminic crosslinking, for example with HMDC.

In EP2033989A1 and EP2292687A1 ACM and AEM rubbers are crosslinked with HMDC and a benzothiazole derivative such as DBU. However it is known to those skilled in the art that the reaction of HMDC and DBU forms substances which cause a very severe odor nuisance. DBU is also classed as toxic.

The present invention has for its object to provide rubber mixtures which are less toxicologically concerning and liberate less, preferably no, volatile organic amines during the vulcanization, where the performance properties, i.e. the degree of crosslinking, the scorch time T10, the complete vulcanization time T90, the tensile strength, the 20, 50 and 100 moduli and the compression set, of the vulcanizates obtainable therefrom are about equal or preferably better than for the corresponding guanidine-containing mixtures/vulcanizates, in particular than for the di-ortho-tolylguanidine-containing (DOTG-containing) mixtures/vulcanizates. It is a particular object to achieve an increase in the degree of crosslinking and an improvement in tensile strength and in the 20, 50 and 100 moduli while leaving the scorch time T10 unchanged.

It is also desirable to provide rubber mixtures which preferably allow simple handling and are easy and safe to produce. To this end it is advantageous to employ a crosslinking system consisting of as few components as possible, preferably of only one component, which preferably results in the abovementioned properties.

It has now been found surprisingly that vulcanization of a mixture comprising
at least one aminically crosslinkable rubber and
a crosslinking system consisting of at least one crosslinker and optionally at least one vulcanization accelerator, wherein the at least one crosslinker comprises polyethyleneimine and wherein the total content of the vulcanization accelerators diphenylguanidine (DPG), di-ortho-tolyl-guanidine (DOTG) and 1-(ortho-tolyl) biguanide of the crosslinking system in the mixture is not more than 0.4 phr, preferably not more than 0.2 phr, particularly preferably not more than 0.1 phr and very particularly preferably not more than 0.01 phr,
results in a mixture having largely unchanged scorch and complete vulcanization times T10 and T90, wherein the vulcanizate obtainable therefrom has identical or improved values in terms of degree of crosslinking, 20, 50 and 100 moduli, tensile strength and compression set compared to guanidine- or DBU-containing vulcanizates.

The unit phr (parts per hundred rubber) above and below stands for parts by weight based on 100 parts by weight of rubber employed in the mixture according to the invention.

The present invention further provides a process for producing the mixture according to the invention in which the at least one aminically crosslinkable rubber, the at least one crosslinker and optionally the at least one vulcanization accelerator are mixed.

It is preferable when in a first step the at least one crosslinker and optionally the at least one vulcanization accelerator are mixed and in a second step the at least one aminically crosslinkable rubber is added, particularly preferably stepwise, to the mixture obtained after the first step.

It is preferable when the mixing of the components to produce the mixture according to the invention is carried out in a kneader.

The addition of the at least one crosslinker may be carried out at any juncture of the mixing.

The mixing of the components to produce the mixture according to the invention is preferably carried out at a temperature between 20° C. and 150° C., particularly preferably at a temperature between 40° C. and less than 100° C., very particularly preferably at a temperature between 45° C. and 60° C.

The mixing is preferably carried out over a period of 2-120 min, particularly preferably of 5-60 min, very particularly preferably of 5-20 min.

The mixture according to the invention is generally rolled out before further processing such as for example vulcanization, preferably using a temperature-controlled roller. The temperature of the roller is preferably below 150° C., particularly preferably below 100° C., very particularly preferably below 50° C., very very particularly preferably between 15° C. and 30° C.

The mixtures according to the invention are particularly suitable for the production of rubber articles, in particular seals, hoses, membranes and O-rings.

The mixtures according to the invention may subsequently be vulcanized in customary fashion.

The present invention further provides a process for producing rubber vulcanizates in which the rubber mixture according to the invention is heated at a temperature of 100-280° C., preferably 150-210° C.

The vulcanization may be carried out at any desired pressure. The vulcanization is preferably carried out at a pressure of 100-500 bar, particularly preferably at a pressure of 200-400 bar, very particularly preferably at a pressure of 250-350 bar.

Once vulcanization is complete the obtained vulcanizates are preferably heat treated, particularly preferably at a temperature of 160-220° C., very particularly preferably of 170-180° C., and preferably for 1-10 hours, particularly preferably for 2-6 hours.

The heat treating is preferably carried out in an oven.

The present invention further provides vulcanizates obtainable by vulcanization of the mixture according to the invention.

The produced vulcanizates are in particular rubber articles, in particular seals, hoses, membranes and O-rings.

The present invention further provides for the use of polyethyleneimine for producing the rubber mixtures, vulcanizates and/or rubber articles according to the invention.

The present invention further provides for the use of a crosslinking system consisting of at least one crosslinker and optionally at least one vulcanization accelerator for crosslinking of at least one aminically crosslinkable rubber.

It is preferable when this crosslinking system consists to an extent of ≥80% by weight, preferably to an extent of ≥90% by weight, particularly preferably to an extent of ≥95% by weight, very particularly preferably to an extent of ≥99% by weight, based on the total mass of the crosslinking system, of at least one crosslinker, wherein the at least one crosslinker comprises polyethyleneimine and optionally at least one diamine, preferably selected from the group consisting of hexamethylenediamine (HMD) and hexamethylenediamine carbamate (HMDC), and the total content of the vulcanization accelerators diphenylguanidine (DPG), di-ortho-tolyl-guanidine (DOTG) and 1-(ortho-tolyl)biguanide of the crosslinking system is not more than 0.4 phr, preferably not more than 0.2 phr, particularly preferably not more than 0.1 phr and very particularly preferably not more than 0.01 phr based on the at least one aminically crosslinkable rubber.

The descriptions and preferred ranges recited for the components present in the mixture according to the invention, such as the at least one aminically crosslinkable rubber, the at least one crosslinker and the optional at least one vulcanization accelerator, apply analogously to the use of the crosslinking system.

Rubber

The mixture according to the invention comprises at least one aminically crosslinkable rubber.

The at least one aminically crosslinkable rubber is a rubber having a particularly polar site, preferably a carboxyl-containing rubber.

Preferred carboxyl-containing rubbers are ACM and AEM rubbers.

The at least one aminically crosslinkable rubber is particularly preferably selected from the group consisting of ACM and AEM rubbers.

In a preferred embodiment the at least one aminically crosslinkable rubber is an ACM rubber.

In an alternative preferred embodiment the at least one aminically crosslinkable rubber is an AEM rubber.

The mixture according to the invention preferably comprises 40-80% by weight of the at least one aminically crosslinkable rubber, particularly preferably 50-70% by weight, based on the total weight of the rubber mixture.

ACM Rubbers

ACM rubbers are generally polymers comprising acrylate and a monomer having a crosslinking site, for example a carboxyl-containing monomer, a chlorine-containing monomer or an epoxy-containing monomer or combinations of the abovementioned monomers.

In the context of the present application ACM rubbers are polymers comprising acrylate and a carboxyl-containing monomer as monomers.

Preferred ACM rubbers are copolymers of acrylate and a carboxyl-containing monomer.

Particularly preferred ACM rubbers are derived from acrylates such as alkyl acrylate monomers or a combination of an alkyl acrylate monomer with an alkoxyalkyl acrylate monomer. The combination of an alkyl acrylate monomer with an alkoxy alkyl acrylate monomer is very particularly preferred.

The alkyl acrylate monomer preferably has an alkyl group having 1 to 8 carbon atoms and is particularly preferably selected from the group consisting of methyl acrylate, ethyl acrylate, n-propyl acrylate, n-butyl acrylate, isopropyl acrylate, isobutyl acrylate, n-hexyl acrylate, 2-ethylhexyl acrylate and cyclohexyl acrylate. Ethyl acrylate and n-butyl acrylate are very particularly preferred.

If a combination of an alkyl acrylate monomer with an alkoxyalkyl acrylate monomer is employed, the amount of the alkyl acrylate units is preferably 30-90% by weight, particularly preferably 40-89% by weight, very particularly preferably 45-88% by weight, based on the total mass of the combination of alkyl acrylate monomer with an alkoxy alkyl acrylate monomer.

The amount of acrylate in an ACM rubber is preferably 90-99.9% by weight, particularly preferably 92.5-99.7% by weight and very particularly preferably 95-99.5% by weight, based on the total mass of the ACM rubber.

It is preferable when the carboxyl-containing monomer of the ACM rubber is selected from the group consisting of carboxylic acid monomers such as acrylic acid, methacrylic acid, itaconic acid, maleic acid, fumaric acid and citraconic acid, butenediacid monoalkyl esters such as monomethyl maleate, monoethyl maleate, mono-n-butyl maleate, monomethyl fumarate, monoethyl fumarate and mono-n-butyl fumarate. The carboxyl group may also be a carboxylic anhydride group and consequently the carboxyl-containing monomer may also be maleic anhydride or citraconic anhydride for example. The carboxyl-containing monomer of the ACM rubber is particularly preferably a butenediacid monoalkyl ester, very particularly preferably selected from the group consisting of monoethyl maleate, mono-n-butyl maleate, monoethyl fumarate and mono-n-butyl fumarate.

The amount of carboxyl-containing monomer in an ACM rubber is preferably 0.1-10% by weight, particularly preferably 0.3-7.5% by weight and very particularly preferably 0.5-5% by weight, based on the total mass of the ACM rubber.

The ACM rubber may also comprise further optional monomers in an amount of 0-30% by weight based on the total mass of the ACM rubber. These optional monomers may be for example conjugated diene monomers, non-conjugated diene monomers, aromatic vinyl monomers, α-,β-ethylenically unsaturated nitrile monomers, amide-containing acrylic or methacrylic monomers, polyfunctional diacrylic or dimethacrylic monomers and aliphatic vinyl monomers.

Examples of ACM rubbers are Nipol® and HyTemp® (Zeon), Noxtite® from Unimatec and ACM rubbers by the name of Racrester™, in particular Racrester™ CH, from Osaka Soda Co. Ltd. Preference is given to Racrester™ CH from Osaka Soda Co. Ltd.

AEM Rubbers

AEM rubbers are polymers comprising acrylate, ethylene and a carboxyl-containing monomer as monomers.

Preferred AEM rubbers are copolymers of acrylate, ethylene and a carboxyl-containing monomer.

It is particularly preferable when the acrylate in the AEM rubber is selected from the group consisting of methyl acrylate and ethyl acrylate, very particularly preferably methyl acrylate.

The same explanations and preferred ranges apply for the carboxyl-containing monomer of the AEM rubber as for the carboxyl-containing monomer of the above-described ACM rubber. A very particularly preferred carboxyl-containing monomer of the AEM rubber is butenediacid monoalkyl ester (CAS-No. 3052-50-4).

One example of AEM rubbers is VAMAC® (DuPont). A preferred AEM rubber is VAMAC® G. As disclosed in EP1499670A2, VAMAC® G is a terpolymer comprising the monomers ethylene, methyl acrylate and methyl hydrogen maleate (corresponds to butenediacid monoalkyl ester, CAS-No. 3052-50-4). The terpolymer comprises 41% by weight ethylene, 55% by weight methyl acrylate and 4% by weight methyl hydrogen maleate.

Crosslinking System

The mixture according to the invention comprises a crosslinking system consisting of at least one crosslinker and optionally at least one vulcanization accelerator, wherein the at least one crosslinker comprises polyethyleneimine.

The crosslinking system preferably consists to an extent of ≥80% by weight, preferably to an extent of ≥90% by weight, particularly preferably to an extent of ≥95% by weight, very particularly preferably to an extent of ≥99% by weight, based on the total mass of the crosslinking system, of at least one crosslinker, wherein the at least one crosslinker comprises polyethyleneimine.

The crosslinking system preferably consists to an extent of ≥80% by weight, preferably to an extent of ≥90% by weight, particularly preferably to an extent of ≥95% by weight, very particularly preferably to an extent of ≥99% by weight, based on the total mass of the crosslinking system, of at least one crosslinker, wherein the at least one crosslinker comprises polyethyleneimine and optionally at least one diamine.

The crosslinking system particularly preferably consists to an extent of ≥80% by weight, preferably to an extent of ≥90% by weight, particularly preferably to an extent of ≥95% by weight, very particularly preferably to an extent of ≥99% by weight, based on the total mass of the crosslinking system, of at least one crosslinker, wherein the at least one crosslinker consists of polyethyleneimine and optionally at least one diamine.

The crosslinking system of the mixture according to the invention most preferably comprises no other crosslinkers than polyethyleneimine and optionally at least one diamine.

For the sake of clarity it is mentioned that the mixture according to the invention comprises the below-mentioned crosslinkers and optional vulcanization accelerators exclusively in the crosslinking system. Crosslinkers and optional vulcanization accelerators thus cannot be present in the mixture according to the invention outside the crosslinking system.

The term "crosslinking system" does not imply a structural or spatial association between the crosslinker and the optional vulcanization accelerator, much less that the constituents of the crosslinking system must be employed in the form of a mixture in the production of the mixture according to the invention.

The mixture according to the invention preferably comprises no other crosslinkers and vulcanization accelerators than the at least one crosslinker and optionally at least one vulcanization accelerator present in the crosslinking system.

Crosslinker

In the context of the present invention crosslinkers are to be understood as meaning compounds which are capable through chemical reactions with the rubber molecules of effecting crosslinking thereof and thus producing a three-dimensional network of rubber molecules.

In the context of the present invention the term polyethyleneimine (PEI) is to be understood as meaning homopolymer(s) of ethyleneimine/copolymer(s) of ethyleneimine and one or more comonomers, wherein in the copolymers the proportion of ethyleneimine-derived repeating units in each case based on the total mass of the polymer is at least 50 wt %, preferably at least 80 wt %, more preferably at least 90 wt %, particularly preferably at least 95 wt % and very particularly preferably at least 98 wt %. The term polyethyleneimine also comprehends mixtures of homo- and/or copolymers of ethyleneimine, for example with different molecular weights, degrees of branching, comonomers etc. The polyethyleneimine may therefore be branched or linear. Mixtures of linear and branched polyethyleneimine are also employable.

In a preferred embodiment the polyethyleneimine is branched. It is particularly preferable when the polyethyleneimine comprises primary, secondary and tertiary amino groups.

It is particularly preferable when the branched polyethyleneimine is produced by polymerization of aziridines. This is described for example in Houben-Weyl, Methoden der Organischen Chemie, volume E20, page 1482-1487, Georg Thieme Verlag Stuttgart, 1987.

It is also possible for the ethyleneimine unit of the polyethyleneimine to be alkylated at one or both carbon atoms, preferably with $C_1$-$C_{20}$-alkyl, particularly preferably with $C_1$-$C_{10}$-alkyl.

Such homo- or copolymers typically have a weight-average molecular weight Mw greater than 200, preferably of 300 to 3,000,000, particularly preferably from 400 to 800,000, very particularly preferably from 500 to 100,000, more preferably from 600 to 30,000 and most preferably from 700 to 7000.

The polyethyleneimine employable in the present invention is particularly preferably that according to CAS number 25987-06-8.

Mixtures according to the invention preferably comprise from 0.001 to 20 phr, particularly preferably from 0.01 to 10 phr, very particularly preferably from 0.1 to 5 phr, very very particularly preferably from 0.2 to 2 phr, of polyethyleneimine.

In a preferred embodiment the at least one crosslinker comprises polyethyleneimine and at least one diamine.

In the context of the present invention diamine is to be understood as meaning a compound having two amino groups. The reaction-retarding form of a diamine as a blocked diamine carbamate is in the context of the present invention also to be understood as a diamine. In the context of the present invention a diamine is preferably a compound comprising two and not more than two amino groups.

Mixtures according to the invention preferably comprise from 0 to 10 phr, particularly preferably from 0 to 5 phr, very particularly preferably from 0 to 3 phr, of at least one diamine.

In a preferred embodiment the at least one crosslinker comprises polyethyleneimine and at least one diamine selected from the group consisting of hexamethylenediamine (HMD) and hexamethylenediamine carbamate (HMDC).

Mixtures according to the invention in which the at least one crosslinker comprises polyethyleneimine and at least one diamine preferably comprise from 0.01 to 10 phr, particularly preferably from 0.1 to 5 phr, very particularly preferably from 0.15 to 1.2 phr, of polyethyleneimine.

These mixtures preferably also comprise from 0.01 to 5 phr, particularly preferably from 0.1 to 3 phr, of at least one diamine, preferably selected from the group consisting of hexamethylenediamine (HMD) and hexamethylenediamine carbamate (HMDC).

Crosslinkers Consisting of Polyethyleneimine and Diamine

In a preferred embodiment the at least one crosslinker consists of polyethyleneimine and at least one diamine.

The at least one diamine is preferably selected from the group consisting of hexamethylenediamine (HMD) and hexamethylenediamine carbamate (HMDC).

In a preferred embodiment of the invention the at least one crosslinker consists of polyethyleneimine and at least one diamine selected from the group consisting of hexamethylenediamine (HMD) and hexamethylenediamine carbamate (HMDC).

Mixtures according to the invention in which the at least one crosslinker consists of polyethyleneimine and at least one diamine preferably comprise from 0.01 to 10 phr, particularly preferably from 0.1 to 5 phr, very particularly preferably from 0.15 to 1.2 phr, of polyethyleneimine.

These mixtures preferably also comprise from 0.01 to 5 phr, particularly preferably from 0.1 to 3 phr, of at least one diamine, preferably selected from the group consisting of hexamethylenediamine (HMD) and hexamethylenediamine carbamate (HMDC).

In this preferred embodiment the crosslinking system of the mixture according to the invention preferably consists to an extent of ≥80% by weight, particularly preferably to an extent of ≥90% by weight, very particularly preferably to an extent of ≥95% by weight, very very particularly preferably to an extent of ≥99% by weight, based on the total mass of the crosslinking system, of at least one crosslinker consisting of polyethyleneimine and at least one diamine, preferably selected from the group consisting of hexamethylenediamine (HMD) and hexamethylenediamine carbamate (HMDC).

The % by weight ratio of diamine to polyethyleneimine may be varied over a wide range. The % by weight ratio of diamine to polyethyleneimine is preferably 10:1-1:10.

In a particularly preferred embodiment the at least one aminically crosslinkable rubber is an ACM rubber.

Such mixtures according to the invention in which the at least one crosslinker consists of polyethyleneimine and at least one diamine, preferably selected from the group consisting of hexamethylene diamine (HMD) and hexamethylenediamine carbamate (HMDC), and the at least one aminically crosslinkable rubber is an ACM rubber preferably comprise from 0.01 to 10 phr, particularly preferably from 0.1 to 5 phr, very particularly preferably 0.15 to 1.2 phr, very very particularly preferably 0.15 to 0.35 phr, of polyethyleneimine.

These abovementioned mixtures preferably also comprise from 0.01 to 5 phr, particularly preferably from 0.1 to 3 phr, very particularly preferably from 0.2 to 1 phr, of at least one diamine, preferably selected from the group consisting of hexamethylenediamine (HMD) and hexamethylenediamine carbamate (HMDC).

The percent by weight ratio of diamine to polyethyleneimine is in these abovementioned mixtures preferably 10:1-1:10, particularly preferably 5:1-1:5, very particularly preferably 5:1-1:2, very very particularly preferably 5:1-1:1, most preferably 3:1-2:1.

In an alternative preferred embodiment the at least one aminically crosslinkable rubber is an AEM rubber.

Such mixtures according to the invention in which the at least one crosslinker consists of polyethyleneimine and at least one diamine, preferably selected from the group consisting of hexamethylene diamine (HMD) and hexamethylenediamine carbamate (HMDC), and the at least one aminically crosslinkable rubber is an AEM rubber preferably comprise from 0.01 to 10 phr, particularly preferably from 0.1 to 5 phr, very particularly preferably 0.15 to 1.2 phr, of polyethyleneimine.

These abovementioned mixtures preferably also comprise from 0.01 to 5 phr, particularly preferably from 0.1 to 3 phr, very particularly preferably from 1 to 3 phr, of at least one diamine, preferably selected from the group consisting of hexamethylenediamine (HMD) and hexamethylenediamine carbamate (HMDC).

Crosslinkers Consisting of Polyethyleneimine

In an alternative preferred embodiment of the invention the at least one crosslinker consists of polyethyleneimine.

Mixtures according to the invention in which the at least one crosslinker consists of polyethyleneimine preferably comprise from 0.001 to 20 phr, particularly preferably from 0.01 to 10 phr, very particularly preferably from 0.1 to 5 phr, very very particularly preferably from 0.2 to 2 phr, of polyethyleneimine.

In this preferred embodiment the crosslinking system consists to an extent of ≥80% by weight, particularly preferably to an extent of ≥90% by weight, very particularly preferably to an extent of ≥95% by weight, very very particularly preferably to an extent of ≥99% by weight, based on the total mass of the crosslinking system, of polyethyleneimine.

Vulcanization Accelerator

The crosslinking system consists of at least one crosslinker and optionally at least one vulcanization accelerator. Accordingly, the crosslinking system may or may not comprise the at least one vulcanization accelerator.

In the context of the present invention vulcanization accelerators are to be understood as meaning compounds which are capable of accelerating a crosslinking reaction between rubber molecules. Vulcanization accelerators are moreover preferably compounds which are distinct from the at least one crosslinker in the context of the present invention.

The vulcanization system preferably comprises not more than 20% by weight, particularly preferably not more than 10% by weight, very particularly preferably not more than 5% by weight, very very particularly preferably not more than 1% by weight, most preferably not more than 0.5% by weight, of vulcanization accelerator.

Examples of such vulcanization accelerators are guanidine-containing compounds, xanthates, bi- or polycyclic amines, dithiophosphates, thiourea derivatives, hexamethylene tetramine and 1,3-bis(citraconimidomethyl)benzene.

For the sake of clarity it is mentioned that the optional at least one vulcanization accelerator in the mixture according to the invention may be present exclusively in the crosslinking system. If the optional at least one vulcanization accelerator is not present in the crosslinking system then it is not present in the mixture according to the invention either.

Guanidine-Containing Compounds

Guanidine-containing compounds may be present in the crosslinking system of the mixture according to the invention in a small amount or not at all.

In the context of the present invention the total content of the vulcanization accelerators diphenylguanidine (DPG), di-ortho-tolyl-guanidine (DOTG) and 1-(ortho-tolyl)biguanide of the crosslinking system in the mixture according to the invention is not more than 0.4 phr, preferably not more than 0.2 phr, particularly preferably not more than 0.1 phr and very particularly preferably not more than 0.01 phr.

It is more preferable when the total content of the vulcanization accelerators diphenylguanidine (DPG), substituted diphenylguanidines, other organic guanidine derivatives, where the guanidine function is substituted with one or more $C_1$-$C_8$ alkyl groups, $C_2$-$C_8$ alkenyl groups, $C_6$-$C_8$ aryl groups, $C_7$-$C_{10}$ aralkyl groups and/or $C_1$-$C_8$ heteroalkyl groups, and 1-(ortho-tolyl)biguanide of the crosslinking system in the mixture according to the invention is not more than 0.4 phr, preferably not more than 0.2 phr, particularly preferably not more than 0.1 phr and very particularly preferably not more than 0.01 phr.

It is most preferable when the total content of the vulcanization accelerators guanidine-containing compounds of the crosslinking system in the mixture according to the invention is not more than 0.4 phr, preferably not more than 0.2 phr, particularly preferably not more than 0.1 phr and very particularly preferably not more than 0.01 phr.

In the context of the present invention the term substituted diphenylguanidines is preferably to be understood as meaning diphenylguanidines where at least one phenyl ring is substituted, preferably both phenyl rings are substituted. A very wide variety of substituents are possible as substituents. Preference is given to a substituent of a phenyl ring selected from the group consisting of substituted or unsubstituted $C_1$-$C_{20}$-alkyl, substituted or unsubstituted $C_2$-$C_{20}$-alkenyl comprising one or more double bonds, substituted or unsubstituted $C_2$-$C_{20}$-alkynyl comprising one or more triple bonds, substituted or unsubstituted $C_3$-$C_{20}$-aryl, substituted or unsubstituted heteroaryl that is five- to twenty-membered and comprises one or more heteroatoms, substituted or unsubstituted $C_3$-$C_{14}$-cycloalkyl, substituted or unsubstituted heterocycloalkyl that is three- to eight-membered and comprises one or more heteroatoms, and heteroatoms.

Support

The mixture according to the invention may further comprise at least one support which is suitable for being capable of absorbing and/or adsorbing the at least one crosslinker thereupon.

Advantages of such supported compounds are improved meterability and/or dispersibility. Such supported compounds are generally also known as "dry liquid".

The at least one support may be inert, organic or inorganic.

Suitable supports are for example light-colored inorganic fillers, for example mica, kaolin, siliceous earth, silica, chalk, talc.

The mixture according to the invention may or may not comprise this at least one support.

In the mixture according to the invention the at least one crosslinker may be absorbed and/or adsorbed onto the at least one support or not absorbed and/or adsorbed onto the at least one support.

The at least one support is preferably selected from the group consisting of natural and synthetic silicates, in particular selected from the group consisting of neutral, acidic and basic silica, aluminum oxide, zinc oxide and mixtures of the above. It is particularly preferable when the at least one support is selected from the group consisting of neutral, acidic and basic silica.

In a preferred embodiment the mixture according to the invention comprises at least one support selected from the group consisting of neutral, acidic and basic silica on which the at least one crosslinker is absorbed and/or adsorbed.

The % by weight ratio of the support, in particular silica, to the at least one crosslinker may be varied over a relatively wide range.

The % by weight ratio of the support, in particular silica, to the at least one crosslinker is preferably 90:10-10:90, particularly preferably 90:10-10:60, very particularly preferably 15:10-10:15.

Further Additives

The mixtures according to the invention may comprise further additives in addition to the abovementioned compounds.

The further additives may be present in the rubber mixture according to the invention in any desired amount, preferably to an extent of 30-200 phr, particularly preferably to an extent of 40-100 phr.

The mixtures according to the invention preferably comprise carbon black as a further additive.

As a further additive preference is given to carbon black produced by the lamp black, furnace black or gas black process. Particular preference is given to carbon black produced by the furnace black process, most preferably carbon black (for example Corax® N-550).

The carbon black preferably has BET surface areas of 20-200 m$^2$/g. Preferred carbon blacks are SAF, ISAF, IISAF, HAF, FEF or GPF carbon blacks.

The total proportion of carbon blacks, preferably carbon blacks produced by the lamp black, furnace black or gas black process, in the rubber mixture is typically from 0 to 160 phr, preferably 1 to 100 phr, particularly preferably 30 bis 70 phr.

In a further preferred embodiment the rubber mixture may comprise 0.1-40 phr, preferably 1-12 phr of a $C_1$-$C_4$-alkyl ester of glycerol, in particular triacetin.

The mixture according to the invention and the rubber vulcanizate according to the invention may comprise further rubber auxiliaries as further additives, for example flow promoters, adhesion systems, aging stabilizers, heat stabilizers, light stabilizers, antioxidants, in particular antiozonants, flame retardants, processing aids, impact-resistance improvers, plasticizers, tackifiers, blowing agents, dyes, pigments, waxes, extenders, organic acids, retarders, metal oxides, and activators, in particular triethanolamine, polyethylene glycol, hexanetriol, and anti-reversion agents.

These rubber auxiliaries are employed in customary amounts which depend inter alia on the intended purpose of the vulcanizates. Customary amounts are 0.1 to 30 phr.

Aging inhibitors employed are preferably alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, ester-containing sterically hindered phenols, thioether-containing sterically hindered phenols, 2,2'-methylene-bis(4-methyl-6-tert-butylphenol) (BPH) and aminic aging stabilizers such as for example mixtures of diaryl-p-phenylendiamines (DTPD), octylated diphenylamine (ODPA), phenyl-α-naphthylamine (PAN), phenyl-β-naphthylamine (PBN), preferably those based on phenylenediamine, for example N-isopropyl-N'-phenyl-p-phenylenediamine, N-1,3-dimethylbutyl-N'-phenyl-p-phenylenediamine (6PPD), N-1,4-dimethylpentyl-N'-phenyl-p-phenylenediamine (7PPD), N,N'-bis-(1,4-dimethylpentyl)-p-phenylenediamine (77PD) or 4,4'-bis(alpha,alpha-dimethylbenzyl)diphenylamine, preferably 4,4'-bis(alpha,alpha-dimethylbenzyl)diphenylamine.

Processing aids should be active between the rubber particles and should counter frictional forces during mixing, plasticizing and forming. Processing aids which may be present in the rubber mixtures according to the invention include all lubricants customary for the processing of plastics, for example hydrocarbons, such as oils, paraffins and PE waxes, fatty alcohols having 6 to 20 carbon atoms, ketones, carboxylic acids, such as fatty acids and montanic acids, oxidized PE wax, metal salts of carboxylic acids, carboxamides and carboxylic esters, for example with the alcohols ethanol, fatty alcohols, glycerol, ethanediol, pentaerythritol and long-chain carboxylic acids as the acid component and mixtures of esters and ethers.

To reduce flammability and to reduce smoke evolution on combustion, the rubber mixture according to the invention may also comprise flame retardants. Examples of compounds used for this purpose include antimony trioxide, phosphoric esters, chloroparaffin, aluminum hydroxide, boron compounds, zinc compounds, molybdenum trioxide, ferrocene, calcium carbonate and magnesium carbonate.

Further plastics may also be added to the rubber mixture according to the invention and the rubber vulcanizate according to the invention prior to the crosslinking, these acting for example as polymeric processing aids or impact modifiers. These plastics are preferably selected from the group consisting of homo- and copolymers based on ethylene, propylene, butadiene, styrene, vinyl acetate, vinyl chloride, glycidyl acrylate, glycidyl methacrylate, acrylates and methacrylates having alcohol components of branched or unbranched C1- to C10-alcohols, particular preference being given to polyacrylates having identical or different alcohol radicals from the group of C4- to C8-alcohols, in particular of butanol, hexanol, octanol and 2-ethylhexanol, polymethylmethacrylate, methyl methacrylate-butyl acrylate copolymers, methyl methacrylate-butyl methacrylate copolymers, ethylene-vinyl acetate copolymers, chlorinated polyethylene.

Known adhesion systems are based on resorcinol, formaldehyde and silica, the so-called RFS direct adhesion systems. These direct adhesion systems may be used in the mixture according to the invention in any desired amount at any point in time during incorporation into the mixture according to the invention.

The further additives present in the mixture according to the invention are preferably distinct from the at least one aminically crosslinkable rubber, the at least one crosslinker present in the crosslinking system and the at least one vulcanization accelerator optionally present in the crosslinking system.

The present invention shall be elucidated hereinbelow through examples but shall not be restricted thereto.

EXAMPLES

Determination of Properties of Rubber Mixtures/Vulcanizates

Rheometer (Vulcameter) Complete Vulcanization Time (T90) 180° C., Scorch Time (T10), Degree of Crosslinking The MDR (moving die rheometer) vulcanization profile and analytical data associated therewith are measured in an MDR 2000 Monsanto rheometer in accordance with ASTM D5289-95. The scorch time T10 is the time at which 10% of the rubber is crosslinked. The complete vulcanization time T90 is the time at which 90% of the rubber has been crosslinked. The degree of crosslinking is measured as the difference between the highest and lowest torque value and is a measure of crosslinking density. The selected temperature was 180° C.

Tensile Strength, 20 Modulus, 50 Modulus, 100 Modulus

These measurements were effected in accordance with DIN 53504 (tensile test, rod S 2).

Compression Set (CS)

The CS values were obtained after compression of the sample by 25% at 125° C. and a hold time at this temperature of 24 hours. The CS values were determined after a relaxation time of 30 min (DIN ISO 815).

Production of Rubber Mixtures and Rubber Vulcanizates

Rubber mixtures were initially produced from the constituents of the rubber mixtures of (comparative) examples 1-12 reported in tables 2, 3, 5 and 6. The respective constituents were then mixed in a respective mixing process as described below.

The constituents of the rubber mixtures of (comparative) examples 1-12 reported in tables 2, 3, 5 and 6 (more particularly described in table 1) were in each case mixed in a so-called "upside down" process. Carbon black, Aflux® 18, Vanfre® VAM, stearic acid, Naugard® 445 and depending on the formulation, Rhenosin® W 759, Rhenogran® HMDC-70, Rhenogran® DOTG-70, Rhenogran® XLA-60 and/or Lupasol® PR 8515 were initially charged in a kneader (GK 1.5) and mixed at a temperature of 50° C. and at about 40 revolutions/min. After about 1 min, half of the rubber Racrester™ CH/VAMAC® G was added and the mixture was mixed for a further minute. After 2 min the remainder of the rubber was added until a torque equilibrium was achieved and the mixture was discharged. The mixture was subsequently transferred to a temperature-controlled roller to obtain a rolled sheet for further processing. The roller temperature was 25° C.

The obtained rubber mixtures of (comparative) examples 1-12 were subjected to complete vulcanization at 180° C. and subsequently heat-treated at 175° C. for 4 hours. The pressure was 300 bar.

TABLE 2

Constituents of rubber mixtures (comparative examples 1-3)

| | Comparative example 1 | | Comparative example 2 | | Comparative example 3 | |
|---|---|---|---|---|---|---|
| | phr | % by wt. | phr | % by wt. | phr | % by wt. |
| Corax® N-550 | 55.00 | 34.35 | 55.00 | 34.06 | 55.00 | 33.93 |
| Aflux® 18 | 0.50 | 0.31 | 0.50 | 0.31 | 0.50 | 0.31 |
| Vanfre® VAM | 1.00 | 0.62 | 1.00 | 0.62 | 1.00 | 0.62 |
| Stearic acid | 1.00 | 0.62 | 1.00 | 0.62 | 1.00 | 0.62 |
| Naugard® 445 Powder | 2.00 | 1.25 | 2.00 | 1.24 | 2.00 | 1.23 |
| Rhenogran® HMDC-70/AEMD | 0.60 | 0.37 | | | 0.60 | 0.37 |
| Racrester™ CH | 100.00 | 62.46 | 100.00 | 61.92 | 100.00 | 61.69 |
| Rhenogran® DOTG-70 | | | 2.00 | 1.24 | 2.00 | 1.23 |

TABLE 3

Constituents of rubber mixtures (comparative example 4 and inventive examples 5 and 6)

| | Comparative example 4 | | Example 5 (of the invention) | | Example 6 (of the invention) | |
|---|---|---|---|---|---|---|
| | phr | % by wt. | phr | % by wt. | phr | % by wt. |
| Coraxe N-550 | 55.00 | 33.93 | 55.00 | 34.30 | 55.00 | 34.32 |
| Aflux® 18 | 0.50 | 0.31 | 0.50 | 0.31 | 0.50 | 0.31 |
| Varifre® VAM | 1.00 | 0.62 | 1.00 | 0.62 | 1.00 | 0.62 |
| Stearic acid | 1.00 | 0.62 | 1.00 | 0.62 | 1.00 | 0.62 |
| Naugard® 445 Powder | 2.00 | 1.23 | 2.00 | 1.25 | 2.00 | 1.25 |

TABLE 1

Trade name, description and manufacturer/marketer of constituents of rubber mixtures from tables 2 and 3 and tables 5 and 6

| Trade name | Description | Manufacturer/marketer |
|---|---|---|
| Racrester™ CH | ACM rubber | Osaka Soda Co. Ltd |
| VAMAC® G | AEM rubber | DuPont |
| Corax® N-550 | Carbon black CB N550 | Orion Engineered Carbons GmbH |
| Rhenogran® DOTG-70 | Diorthotolylguanidine | LANXESS Deutschland GmbH |
| Aflux® 18 | Flow promoter (primary fatty amine) | LANXESS Deutschland GmbH |
| Vanfre® VAM | Demolding agent (phosphate ester) | Vanderbilt Chemicals, LLC |
| Stearic acid | Processing aid | Peter Greven GmbH und Co. KG |
| Rhenosin® W 759 | Processing aid (mixture of ether/ester) | LANXESS Deutschland GmbH |
| Naugard® 445 | Aging stabilizer 4,4'-bis(alpha,alpha-dimethylbenzyl)diphenylamine | Addivant |
| Rhenogran® HMDC-70/AEMD | Hexamethylenediamine carbamate | LANXESS Deutschland GmbH |
| Rhenogran® XLA-60 | Activated DBU | LANXESS Deutschland GmbH |
| Lupasol® PR 8515 | Polyethylenimine, CAS-No.: 25987-06-8 | BASF AG |

TABLE 3-continued

Constituents of rubber mixtures (comparative example 4 and inventive examples 5 and 6)

|  | Comparative example 4 | | Example 5 (of the invention) | | Example 6 (of the invention) | |
| --- | --- | --- | --- | --- | --- | --- |
|  | phr | % by wt. | phr | % by wt. | phr | % by wt. |
| Rhenogran ® HMDC-70/AEMD | 0.60 | 0.37 | 0.60 | 0.37 | | |
| Racrester ™ CH | 100.00 | 61.69 | 100.00 | 62.36 | 100.00 | 62.40 |
| Rhenogran ® DOTG-70 | | | | | | |
| Lupasol ® PR 8515 | | | 0.25 | 0.16 | 0.75 | 0.47 |
| Rhenogran ® XLA-60 | 2.00 | 1.23 | | | | |

Reported amounts are in phr (parts by weight per 100 parts rubber) and percent by weight (based on the total weight of the rubber mixture).

The produced rubber mixtures of (comparative) examples 1-12 and the vulcanizates obtainable therefrom were subjected to the technical tests specified hereinbelow. The determined values are reported in tables 4, 7 and 8. The rubber mixtures of examples 5, 6, 11 and 12 and the vulcanizates obtained therefrom, whose results are shown under "Example 5", "Example 6", "Example 11" and "Example 12" in tables 4, 7 and 8, are inventive.

The mixing steps and the sequence of additives may be varied as desired and polyethyleneimine may be added in any desired mixing step.

T10 an advantageous reduction in compression set and advantageous increase in degree of crosslinking and tensile strength are achieved.

The same applies to a comparison of the inventive rubber mixture according to example 5 with the rubber mixture according to comparative example 4 which comprises DBU as a guanidine substitute and as mentioned in more detail above represents a known standard crosslinking formulation for an ACM rubber.

Inventive Example 6 Compared to Comparative Examples 1 and 3

In a sole departure from the rubber mixture from comparative example 3, the rubber mixture according to comparative example 1 comprises no vulcanization accelerator. Crosslinking is effected only via the crosslinker HMDC (0.37% by weight) without vulcanization accelerator. Crosslinking is therefore markedly slower (longer T90), degree of crosslinking and tensile strength are lower and compression set is greater. The inventive mixture of example 6 also comprises no vulcanization accelerator but utilizes 0.47% by weight of polyethyleneimine instead of HMDC as crosslinker. Compared to comparative example 1 a faster complete vulcanization time T90 is observed while retaining a short scorch time T10. The degree of crosslinking, tensile strength and moduli at 20%, 50% and 100% extension are higher and therefore more advantageous. Even the standard crosslinking formulation known to those skilled in the art

TABLE 4

Results of technical tests

|  | Comparative example 1 | Comparative example 2 | Comparative example 3 | Comparative example 4 | Example 5 (of the invention) | Example 6 (of the invention) |
| --- | --- | --- | --- | --- | --- | --- |
| Scorch time T10 [sec] | 29.0 | 18.0 | 30.0 | 30.0 | 31.0 | 26.0 |
| Complete vulcanization time T90 [sec] | 571.0 | 520.0 | 335.0 | 346.0 | 499.0 | 445.0 |
| Degree of crosslinking (Fmax-Fmin) | 2.4 | 0.5 | 4.0 | 3.7 | 7.2 | 6.8 |
| Tensile strength [MPa] | 5.9 | | 8.6 | 7.3 | 9.5 | 8.8 |
| 20% tensile modulus [MPa] | 0.3 | | 0.4 | 0.4 | 0.5 | 0.5 |
| 50% tensile modulus [MPa] | 0.5 | | 0.6 | 0.6 | 1.1 | 1.2 |
| 100% tensile modulus [MPa] | 0.8 | | 1.2 | 1.0 | 3.1 | 3.3 |
| Compression set [%] | 24.0 | | 19.0 | 25.0 | 15.0 | 27.0 |

Inventive Example 5 Compared to Comparative Examples 3 and 4

Comparative example 3 represents a standard crosslinking formulation for an ACM rubber known to those skilled in the art. In addition to rubber, processing aids and carbon black it comprises 0.37% by weight of crosslinker HMDC and 1.23% by weight of the vulcanization accelerator DOTG. The inventive formulation in example 5 comprises only 0.16% polyethyleneimine instead of the guanidine accelerator DOTG. While retaining the short scorch time according to comparative example 3 is surpassed in terms of degree of crosslinking, tensile strength and moduli.

Comparative Example 2

Comparative example 2 shows the standard crosslinking formulation of comparative example 3 without the crosslinker HMDC and thus only with the vulcanization accelerator DOTG alone. No crosslinking reaction took place using only DOTG alone.

TABLE 5

Constituents of AEM rubber mixtures (comparative examples 7-9)

| | Comparative example 7 | | Comparative example 8 | | Comparative example 9 | |
|---|---|---|---|---|---|---|
| | phr | % by wt. | phr | % by wt. | phr | % by wt. |
| VAMAC ® G | 100.00 | 57.77 | 100.00 | 56.59 | 100.00 | 55.93 |
| Corax ® N-550 | 60.00 | 34.66 | 60.00 | 33.96 | 60.00 | 33.56 |
| Naugard ® 445 Powder | 2.00 | 1.16 | 2.00 | 1.13 | 2.00 | 1.12 |
| Rhenosin ® W 759 | 6.00 | 3.47 | 6.00 | 3.40 | 6.00 | 3.36 |
| Vanfre ® VAM | 1.00 | 0.58 | 1.00 | 0.57 | 1.00 | 0.56 |
| Aflux ® 18 | 0.50 | 0.29 | 0.50 | 0.28 | 0.50 | 0.28 |
| Rhenogran ® HMDC-70/AEMD | 2.10 | 1.21 | | | 2.10 | 1.17 |
| Rhenogran ® DOTG-70 | | | 5.70 | 3.23 | 5.70 | 3.19 |
| Stearic acid | 1.50 | 0.87 | 1.50 | 0.85 | 1.50 | 0.84 |

TABLE 6

Constituents of rubber mixtures (comparative example 10 and inventive examples 11 and 12)

| | Comparative example 10 | | Example 11 (inventive) | | Example 12 (inventive) | |
|---|---|---|---|---|---|---|
| | phr | % by wt. | phr | % by wt. | phr | % by wt. |
| VAMAC ® G | 100.00 | 57.77 | 100.00 | 57.52 | 100.00 | 57.72 |
| Corax ® N-550 | 60.00 | 34.66 | 60.00 | 34.51 | 60.00 | 34.63 |
| Naugard ® 445 Powder | 2.00 | 1.16 | 2.00 | 1.15 | 2.00 | 1.15 |
| Rhenosin ® W 759 | 6.00 | 3.47 | 6.00 | 3.45 | 6.00 | 3.46 |
| Vanfre ® VAM | 1.00 | 0.58 | 1.00 | 0.58 | 1.00 | 0.58 |
| Aflux ® 18 | 0.50 | 0.29 | 0.50 | 0.29 | 1.00 | 0.58 |
| Rherlograne HMDC-70/AEMD | 2.10 | 1.21 | 2.10 | 1.21 | | |
| Rhenogran ® DOTG-70 | | | | | | |
| Stearic acid | 1.50 | 0.87 | 1.50 | 0.86 | 1.50 | 0.87 |
| Lupasol ® PR 8515 | | | 0.75 | 0.43 | 1.75 | 1.01 |
| Rhenogran ® XLA-60 | 2.00 | | | | | |

Reported amounts are in phr (parts by weight per 100 parts rubber) and percent by weight (based on the total weight of the rubber mixture).

TABLE 7

Results of technical tests (examples 7-9)

| | Comparative example 7 | Comparative example 8 | Comparative example 9 |
|---|---|---|---|
| Scorch time T10 [sec] | 49.0 | 26.0 | 43.0 |
| Complete vulcanization time T90 [sec] | 1278.0 | 668.0 | 469.0 |
| Degree of crosslinking (Fmax-Fmin) | 10.8 | 0.3 | 13.3 |
| Tensile strength [MPa] | 16.3 | | 14.5 |
| 20% tensile modulus [MPa] | 4.7 | | 1.1 |

TABLE 7-continued

Results of technical tests (examples 7-9)

| | Comparative example 7 | Comparative example 8 | Comparative example 9 |
|---|---|---|---|
| 50% tensile modulus [MPa] | 2.3 | | 2.2 |
| 100% tensile modulus [MPa] | 4.9 | | 5.0 |

TABLE 8

Results of technical tests (comparative example 10 and inventive examples 11 and 12)

| | Comparative example 10 | Example 11 (inventive) | Example 12 (inventive) |
|---|---|---|---|
| Scorch time T10 [sec] | 44.0 | 46.0 | 30.0 |
| Complete vulcanization time T90 [sec] | 501.0 | 773.0 | 634.0 |
| Degree of crosslinking (Fmax-Fmin) | 13.4 | 18.1 | 11.9 |
| Tensile strength [MPa] | 17.0 | 15.6 | 14.2 |
| 20% tensile modulus [MPa] | 1.3 | 1.4 | 1.4 |
| 50% tensile modulus [MPa] | 2.8 | 3.4 | 3.6 |
| 100% tensile modulus [MPa] | 6.4 | 7.8 | 8.6 |

Inventive Example 11 Compared to Comparative Examples 9 and 10

Comparative example 9 represents a standard crosslinking formulation for an AEM rubber known to those skilled in the art. In addition to rubber, processing aids and carbon black it comprises 1.17% by weight of crosslinker HMDC and 3.19% by weight of the vulcanization accelerator DOTG. The inventive formulation in example 11 comprises only 0.43% by weight of polyethyleneimine instead of the guanidine accelerator DOTG. While retaining a similarly short scorch time T10, an advantageous increase in the degree of crosslinking, tensile strength and tensile moduli at 20%, 50% and 100% elongation are achieved.

Similar advantages are revealed by a comparison of the inventive rubber mixture according to example 11 with the rubber mixture according to comparative example 10 which comprises DBU as a guanidine substitute and as mentioned in more detail above likewise represents a known standard crosslinking formulation for an ACM rubber.

Inventive Example 12 Compared to Comparative Examples 7 and 9

In a sole departure from the rubber mixture from comparative example 9, the rubber mixture according to comparative example 7 comprises no vulcanization accelerator. Crosslinking is effected only via the crosslinker HMDC (1.21% by weight) without vulcanization accelerator. The crosslinking is thus markedly slower (longer T90) and the degree of crosslinking is lower. The inventive mixture of example 12 also comprises no vulcanization accelerator but utilizes 1.01% by weight of polyethyleneimine instead of HMDC as crosslinker. Compared to comparative example 7 a markedly faster complete vulcanization time T90 is observed while retaining a short scorch time T10. The degree of crosslinking and the moduli at 50% and 100% extension are higher and therefore more advantageous. Even the standard crosslinking formulation known to those skilled in the art according to comparative example 9 is surpassed in terms of stress moduli at 20%, 50% and 100% extension while retaining similar tensile strength.

Comparative Example 8

Comparative example 8 shows the standard crosslinking formulation of comparative example 9 without the crosslinker HMDC and thus only with the vulcanization accelerator DOTG alone. No crosslinking reaction took place using only DOTG alone.

In summary it has surprisingly been found that the use of polyethyleneimine instead of the guanidine-containing vulcanization accelerator DOTG or instead of the crosslinker HMDC or instead of both HMDC and DOTG makes it possible to provide rubber mixtures whose performance properties are not only at the same level as those of the guanidine- and/or HMDC-containing equivalents but rather are even advantageously set apart therefrom, in particular in terms of the tensile strength, moduli and degree of crosslinking of the vulcanizates obtainable therefrom.

What is claimed is:

1. A mixture comprising
   at least one aminically crosslinkable rubber and
   a crosslinking system consisting of at least one crosslinker and optionally at least one vulcanization accelerator, wherein the at least one crosslinker comprises polyethyleneimine and at least one diamine and wherein the total content of the vulcanization accelerators diphenylguanidine (DPG), di-ortho-tolyl-guanidine (DOTG) and 1-(ortho-tolyl)biguanide of the crosslinking system in the mixture is not more than 0.4 phr.

2. The mixture as claimed in claim 1, wherein the crosslinking system consists to an extent of ≥80% by weight, based on the total mass of the crosslinking system, of at least one crosslinker, wherein the at least one crosslinker comprises polyethyleneimine.

3. The mixture as claimed in claim 1, wherein the at least one crosslinker consists of polyethyleneimine and at least one diamine.

4. The mixture as claimed in claim 1, wherein the content of polyethyleneimine is from 0.001 to 20 phr.

5. The mixture as claimed in claim 1, wherein the content of the at least one diamine, is from 0.01 to 5 phr.

6. The mixture as claimed in claim 1, wherein the at least one aminically crosslinkable rubber is a carboxyl-containing rubber.

7. The mixture as claimed in claim 1, wherein the at least one aminically crosslinkable rubber is an ACM rubber, the content of polyethyleneimine is 0.01 to 10 phr, and the content of the at least one diamine is 0.01 to 5 phr.

8. The mixture as claimed in claim 1, wherein the mixture comprises at least one support selected from the group consisting of neutral, acidic and basic silica on which the at least one crosslinker is absorbed and/or adsorbed.

9. A process for producing a mixture as claimed in claim 1, comprising mixing in a first step the at least one crosslinker and optionally the at least one vulcanization accelerator and adding in a second step the at least one aminically crosslinkable rubber to the mixture obtained after the first step.

10. A process for producing rubber vulcanizates, comprising vulcanizing the mixture according to claim 1.

11. A vulcanizate produced by vulcanizing the mixture according to claim 1.

12. A rubber article comprising one or more vulcanizates as claimed in claim 11.

13. A vehicle comprising at least one rubber article as claimed in claim 12.

14. The mixture as claimed in claim 1, wherein the at least one aminically crosslinkable rubber is an AEM rubber, the content of polyethyleneimine is 0.01 to 10 phr, and the content of the at least one diamine is 0.01 to 5 phr.

15. The mixture as claimed in claim 1, wherein the crosslinking system consists to an extent of ≥95% by weight, based on the total mass of the crosslinking system, of at least one crosslinker, wherein the at least one crosslinker comprises polyethyleneimine.

16. The mixture as claimed in claim 1, wherein the at least one diamine is selected from the group consisting of hexamethylenediamine (HMD) and hexamethylenediamine carbamate (HMDC).

17. The mixture as claimed in claim 1, wherein the at least one aminically crosslinkable rubber is a carboxyl-containing rubber selected from the group consisting of polyacrylate and ethylene acrylate rubbers.

* * * * *